May 17, 1960     J. CHAMBERLAIN     2,936,578
VARIABLE ORIFICE TYPE JET NOZZLE
Filed May 6, 1954
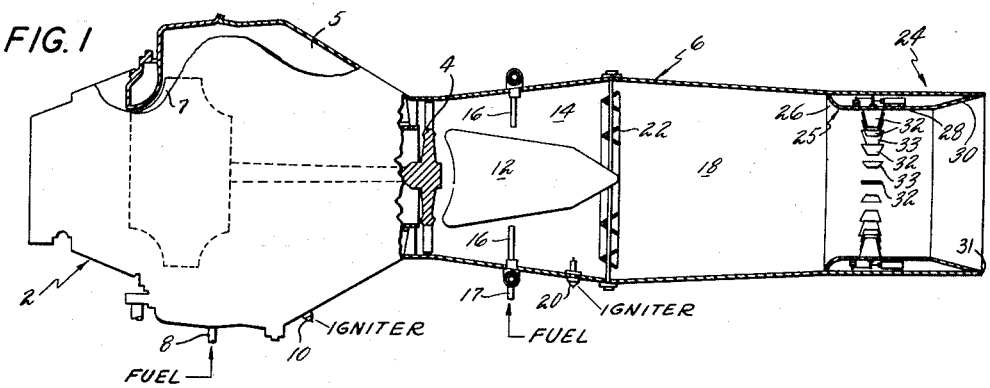
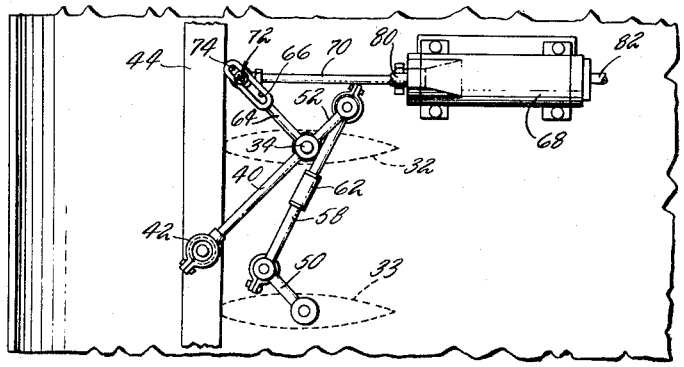
INVENTOR
JOHN CHAMBERLAIN
BY *Jack N. McCarthy*
AGENT

# United States Patent Office 2,936,578
Patented May 17, 1960

2,936,578

VARIABLE ORIFICE TYPE JET NOZZLE

John Chamberlain, Manchester, Conn., assignor to United Aircraft Corporation, East Hartford, Conn., a corporation of Delaware Application May 6, 1954, Serial No. 427,912

3 Claims. (Cl. 60—35.6)

This invention relates to a variable convergent-divergent jet nozzle and more particularly to the type used for an aircraft engine designed to fly at supersonic speed.

An object of this invention is to provide simultaneously a desired variation of throat size and a higher jet thrust at one or more throat sizes than contemporary nozzles can offer.

Another object of this invention is to provide a nozzle with less complexity than fully variable convergent-divergent nozzles.

A further object of this invention is to provide a nozzle which will eliminate sliding movement, such as between joints, to eliminate leakage.

Further objects and advantages will be apparent from the following specification and drawings.

Fig. 1 is a view of a jet engine and afterburner combination with the greater portion of the engine in outline form and with the remainder of the engine and the afterburner in longitudinal cross section.

Fig. 2 is an enlarged view in longitudinal cross section of the nozzle actuating mechanism as shown in Fig. 1.

Fig. 3 is a sectional view along the line 3—3 of Fig. 2.

Fig. 4 is a sectional view along the line 4—4 of Fig. 2 with the forward part of the throat section broken away.

With reference to Fig. 1, the turbojet engine 2 shown by way of example is a centrifugal type having its compressor 7 driven by a turbine 4. Combustion chambers 5 therein deliver air from the compressor to the turbine. An afterburner 6 is attached to the turbine outlet to provide a means of increasing the thrust.

Air is directed into the engine to the compressor. Compressed air discharged from the compressor passes to the turbine 4 through the combustion chambers 5 where it is mixed with fuel. Fuel is delivered to said engine through conduit 8. The fuel-air mixture is initially ignited within the combustion chambers by spark igniter 10. It is to be understood that any fuel supply means and ignition means for an engine may be used.

From the turbine 4, the gases pass around a tail cone 12 into the diffuser section 14 of the afterburner, in which section the outer walls normally diverge in a downstream direction. When the afterburner is operating, fuel is discharged into these gases from a plurality of fuel nozzles 16 projecting inwardly from the outer walls of the diffuser 14 and connected to a fuel conduit 17. Since the gases leaving the turbine 4 contain considerable unburned oxygen the additional fuel introduced by fuel nozzles 16 provides a combustible mixture which may be initially ignited within the combustion chamber 18 by spark igniter 20. Here again, for the afterburner it is to be understood that any type of fuel supply means and ignition means for an afterburner can be used. The burning of this combustible mixture is stabilized in the combustion chamber 18 of the afterburner by flameholder 22. A flameholder accomplishes this by providing an area in which the axial velocities of the combustible mixture are maintained at a value below that at which "blowout" occurs. The burned gases discharge from the engine through the nozzle 24 whose area can be varied in accordance with the present invention.

The nozzle consists of a fixed duct 25 having a convergent portion 26, a straight throat portion 28 of substantial axial dimension and a divergent portion 30 defining exhaust outlet 31 at its downstream end, with a group of nozzle vanes 32, 33 mounted in the straight throat section. As seen in Figs. 2, 3 and 4, each of these vanes is mounted for rotation about a center axis substantially radially of the nozzle, with all of the axes extending in a plane which is perpendicular to the centerline of the afterburner. With the nozzle vanes 32, 33 "open," which is the vane slow speed position and is shown in solid lines in the figures, the thrust of the nozzle will approximate that a plain convergent-divergent nozzle, which is the best possible design at high pressure ratios. With the vanes partially or completely closed, which is the vane high speed position (see dotted lines in Fig. 4 for "fully closed" position), the thrust at high pressure ratios will be better than that of a convergent nozzle in view of the fact that (a) part of the supersonic expansion is provided by a divergent section and (b) the supersonic expansion provided by the orifice formed and the following straight section is better than that of a plain orifice for the orifice or exhaust nozzle throat formed by the inner diameter of vanes 32 and 33 is spaced a sufficient distance axially forward of divergent wall 30 that the engine exhaust gases passing therethrough may expand against divergent wall 30 to generate thrust. Without straight portion 28, the engine exhaust gases passing through the vane throat (Fig. 4) would pass inwardly of divergent duct 30 and atmospheric pressure would act against surface 30 and cause drag. It will further be noted that with vanes 32 and 33 in their slow supersonic speed Fig. 1 position, a convergent-divergent exhaust nozzle is formed having an area ratio, that is the quotient of the area of the exhaust nozzle outlet 31 divided by nozzle throat 28 which is less than the area ratio of the convergent-divergent exhaust nozzle formed when vanes 32 and 33 are in their high supersonic speed, Fig. 4 position wherein the inner diameter of vanes 32 and 33 form the nozzle throat.

Each nozzle vane 32, 33 is formed as a segment of an annular ring in side elevation, as seen in Fig. 2, and has a streamlined cross section, as seen in Fig. 3. An actuating shaft 34 is fixedly attached to the center of the outer end 35 of each nozzle vane which is located adjacent the straight throat section 28. Each shaft 34 extends through a boss 36 located in the straight throat portion 28 of said nozzle into annular space 37. Annular space 37 is formed between the duct 25 and shell of afterburner 6. A retaining collar 38 is fixed to said shaft within space 37, as it projects through said boss, to hold the vane in place.

The vane actuating mechanism provides means for rotating alternate flaps in opposite directions between their "fully open" and "fully closed" positions. Alternate nozzle vanes 32 as viewed from outer end 35, see Fig. 3, are rotated in a clockwise manner into their closed position while alternate nozzle vanes 33 are rotated in a counterclockwise manner into their closed position. By rotating the vanes in an alternate manner, relatively efficient divergent passages are provided between alternate partially closed vanes, and swirl of the exhaust gases is avoided.

As best shown in Fig. 4 the vanes are of such a dimension that in fully closed position the vanes engage each other to form a substantially continuous ring-like closure extending inwardly from the straight throat portion 28 of the duct thereby effectively reducing the diameter of the nozzle at this point and accordingly effectively reducing the flow area through the duct.

Each alternate vane 32 is provided with an arm 40 which is fixed to the free end of its shaft 34 and extends forwardly from said shaft at an angle of approximately 45° away from the streamline axis of the vane. A ring 44 is operatively connected to the free ends of levers 40 on the several vanes 32 to coordinate the movement of the vanes. For the connections to the ring 44, the free end of each arm 40 is provided with a ball socket 42. Pivotally mounted within each ball socket 42 is a ball 46 having a hole therethrough. Ring 44 is provided with a plurality of equally spaced radially extending rods 48 which are positioned so that there is one extending through each hole presented by balls 46. Rods 48 are dimensioned so as to have a slideable fit in the holes in balls 46. From this it can be seen that movement of ring 44 will be transmitted to all of the alternate vanes 32. The rods 48 will move through a small arc changing their angular position which is provided for by the ball and socket joints and the small radial movement of the balls 46 along the rods 48 is provided for by the slideable fit therebetween.

Each vane 32 is connected to one adjacent of the vanes 33 to provide for movement thereof. An arm 50 is fixed to the free end of the shaft of each vane 33 and extends forwardly from said shaft at an angle of approximately 45° away from the streamlined axis of the vane and forms an angle of approximately 90° with the centerline of arm 40 of cooperating vane 32. Vane 32 is also provided with another arm 52 which is fixed to the free end of its shaft and extends rearwardly away from said shaft in a direction which is a continuation of the centerline of arm 40 extended. The free end of arm 52 has a ball 54 attached thereto and the free end of arm 50 has a ball 56 fixed thereto. To coordinate the movement of vanes 33 with vanes 32 a connecting link 58 is operatively connected at one end to the free end of lever 52 of a vane 32 and connected at its other end to the free end of arm 50 of one of the adjacent vanes 33. Link 58 has a ball socket on each end, one socket being positioned around ball 56 of arm 50, another socket being mounted around ball 54 of arm 52. Each link 58 has means for adjusting its length. This may be a collar arrangement as shown in Fig. 3 at 62, or any other means desired. From the connection between a vane 32 and its cooperating vane 33 it can be seen that the movement of a vane 32 in one direction will move its cooperating vane 33 in an opposite direction.

As stated hereinbefore, the ring 44 is connected to each of the vanes 32 so that the movement of the vanes is coordinated. Further, the connection between each of the vanes 32 and its cooperating vane 33 assures that the vanes 32 will move in a coordinated manner in the opposite direction from which the vane 33 is moving. In the construction shown the vanes are rotated by rotating each of two vanes 32 which are located approximately 180° apart (see Fig. 1). From this it can be seen that as these two vanes are rotated, the arms 40 connected thereto will move the ring 44, the ring 44 in turn moving the remaining vanes 32. Since each vane 32 is connected to an adjacent vane 33 these connections will in turn rotate the vanes 33.

To rotate the two vanes 32 located approximately 180° apart, an arm 64 extends from the shaft 34, at a point midway between the free end and end attached to the vane 32, forwardly and at an angle of approximately 45° away from the streamline axis of the vane and forming an angle of approximately 90° with the centerline of arm 40. The free end of said arm 64 is formed having a long slot 66 extending along its length. A cylinder 68 is mounted in annular space 37 at a point behind each of the free ends of arm 64. A piston is located in each cylinder having a piston rod 70 extending forwardly through the end of the cylinder. A bolt 72 extends through the long slot 66 of each arm 64 and a hole in a boss 74 on the free end of each piston rod 70. Each bolt 72 is maintained in place by a head 76 on the top and a nut 78 on the bottom thereof. Each cylinder 68 has an opening 80 at its forward end to apply pressure to that side of the piston in the cylinder or to connect that side of the piston to drain and each cylinder 68 has an opening 82 at its rearward end to apply pressure to that side of the piston in the cylinder or to connect that side of the piston to drain. It can be seen that as each forward end of the cylinder 68 is connected to an actuating pressure and the other end to drain, the movement of the piston within the cylinder will in turn be conveyed to the arms 64 to rotate the vanes by piston rods 70. While an actuating system has been shown having two cylinders, it will be recognized that each vane could be actuated by a separate cylinder, each alternate cylinder being arranged to move in a direction which is opposite to its adjacent cylinders.

Although only one embodiment of this invention has been illustrated and described herein it will be apparent that various changes and modifications may be made in the construction and arrangement of the various parts without departing from the scope of this novel concept.

What it is desired to obtain by Letters Patent is:

1. A variable area, convergent-divergent thrust nozzle of circular cross section for a supersonic jet engine including a fluid outlet duct having an axis and thru which jet engine exhaust gases are discharged to atmosphere to generate thrust, a fixed annular restriction formed on the inner wall of said duct and defining the wall of the exhaust gas passage through said duct, said fixed restriction having a leading converging portion, a straight duct portion downstream of said converging portion and a diverging portion downstream of said straight portion defining the outlet of said outlet duct, a plurality of vanes mounted around the inner periphery of said straight duct portion and longitudinally spaced from said diverging portion and with their outer ends substantially in engagement with said straight portion, said vanes projecting substantially radially inwardly from the inner periphery of said straight duct portion, each vane being rotatably mounted about its substantially radial axis, said vanes being rotatable from a low speed position wherein said vanes extend longitudinally of said duct and said fixed annular restriction forms a convergent-divergent exhaust nozzle having a first area ratio defined by said outlet and said straight duct portion and a high speed position wherein said vanes extend transversely of said duct in abutting fashion with said vanes forming an annular ring spaced a sufficient distance forward of said divergent section so that the exhaust gases passing thru the throat defined by the inner diameter thereof expand against said divergent portion and wherein a convergent-divergent exhaust nozzle having an area ratio greater than said first area ratio is formed defined by said outlet and said ring inner diameter.

2. A variable area, convergent-divergent exhaust nozzle of circular cross section for supersonic flight including a fixed area duct defining an exhaust gas passage, said fixed area duct having an inlet end and outlet end, a fixed area, smooth-walled annular restriction in said duct located adjacent said outlet end, said fixed annular restriction comprising a convergent inlet section into which engine exhaust gases are received, a divergent outlet section forming the outlet of said exhaust gas passage thru which engine exhaust gases are discharged to atmosphere to generate thrust and a cylindrical throat section of substantial axial dimension and joining said convergent inlet and divergent outlet sections, a movable annular restriction in the form of a plurality of vanes each pivotally attached to said fixed annular restriction about a radial axis and extending from their outer periphery to their inner periphery in substantially a radial direction in relation to said fixed annular restriction, adjacent vanes being mounted for counter-rotation, said vanes being rotatable from a low speed position wherein said vanes extend longitudinally of said duct and said fixed annular restriction forms a convergent-divergent exhaust nozzle having a first area ratio defined by said outlet and said cylindrical throat section and a high speed position wherein said vanes extend transversely of said duct in abutting fashion with said vanes forming an annular ring spaced a sufficient distance forward of said divergent section so that the exhaust gases passing thru the throat defined by the inner diameter thereof expand against said divergent portion and wherein a convergent-divergent exhaust nozzle having an area ratio greater than said first area ratio is formed defined by said outlet and said ring inner diameter.

3. A variable area, convergent-divergent exhaust thrust nozzle of circular cross section for supersonic flight having an axis, a duct having an upstream end adapted to receive engine exhaust gases and a downstream end, a fixed annular restriction cooperating with said duct to define an annular cavity and having a convergent wall at said upstream end, a diverging wall at said downstream end defining an exhaust gas outlet to atmosphere, a straight duct wall joining said convergent and divergent walls and coacting therewith to form a continuous, smooth-walled exhaust gas passage, a plurality of radially inwardly directed vanes mounted around the inner periphery of said straight throat section and spaced upstream of said divergent wall, adjacent vanes being mounted about substantially radially extending axes for rotation in opposite directions, means enveloped within said cavity to rotate said vanes from a low speed position wherein said vanes extend longitudinally of said duct and said fixed annular restriction forms a convergent-divergent exhaust nozzle having a first area ratio defined by said outlet and said straight duct wall and a high speed position wherein said vanes extend transversely of said duct in abutting fashion with said vanes forming an annular ring spaced a sufficient distance forward of said divergent wall so that the exhaust gases passing thru the throat defined by the inner diameter thereof expand against said divergent wall and wherein a convergent-divergent exhaust nozzle having an area ratio greater than said first area ratio is formed defined by said outlet and said ring inner diameter.

References Cited in the file of this patent

UNITED STATES PATENTS

| | | |
|---|---|---|
| 1,344,518 | Rees | June 22, 1920 |
| 1,978,127 | Downs | Oct. 23, 1934 |
| 2,305,311 | Jendrassik | Dec. 15, 1942 |
| 2,435,091 | Meyer | Jan. 27, 1948 |
| 2,579,043 | Kallal | Dec. 18, 1951 |
| 2,610,464 | Knoll | Sept. 16, 1952 |
| 2,637,984 | Bloomberg | May 12, 1953 |
| 2,651,496 | Buckland et al. | Sept. 8, 1953 |
| 2,669,834 | Helms | Feb. 23, 1954 |
| 2,689,680 | Lovesey | Sept. 21, 1954 |
| 2,697,326 | Featonby | Dec. 21, 1954 |
| 2,770,944 | Jordan | Nov. 20, 1956 |
| 2,753,685 | Mattinson | July 10, 1956 |

FOREIGN PATENTS

| | | |
|---|---|---|
| 995,748 | France | Aug. 22, 1951 |
| 845,156 | Germany | July 28, 1952 |